US009417441B2

(12) United States Patent  
Miyazaki

(10) Patent No.: US 9,417,441 B2  
(45) Date of Patent: Aug. 16, 2016

(54) PROJECTION OPTICAL SYSTEM AND PROJECTION APPARATUS

(71) Applicant: Panasonic Intellectual Property Management Co., Ltd., Osaka (JP)

(72) Inventor: Kyoichi Miyazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 18 days.

(21) Appl. No.: 14/611,699

(22) Filed: Feb. 2, 2015

(65) Prior Publication Data

US 2015/0226946 A1    Aug. 13, 2015

(30) Foreign Application Priority Data

Feb. 13, 2014    (JP) .................................. 2014-025357

(51) Int. Cl.
| | |
|---|---|
| *G02B 15/14* | (2006.01) |
| *G02B 3/00* | (2006.01) |
| *G02B 15/177* | (2006.01) |
| *G02B 13/16* | (2006.01) |
| *G03B 21/14* | (2006.01) |
| *G03B 21/00* | (2006.01) |

(52) U.S. Cl.  
CPC .............. *G02B 15/177* (2013.01); *G02B 13/16* (2013.01); *G03B 21/005* (2013.01); *G03B 21/142* (2013.01)

(58) Field of Classification Search  
USPC .................................. 359/649, 676, 811–830  
See application file for complete search history.

(56) References Cited

U.S. PATENT DOCUMENTS

| 7,715,111 | B2 * | 5/2010 | Yamamoto ........... | G02B 15/177 359/649 |
| 8,223,435 | B2 * | 7/2012 | Amano ................. | G02B 7/028 359/649 |
| 2001/0050818 | A1 * | 12/2001 | Wada ..................... | G02B 9/62 359/649 |

(Continued)

FOREIGN PATENT DOCUMENTS

| JP | 2001-235679 | 8/2001 |
| JP | 2003-015037 | 1/2003 |
| JP | 2004-138640 | 5/2004 |

(Continued)

*Primary Examiner* — Mohammed Hasan  
(74) *Attorney, Agent, or Firm* — Wenderoth, Lind & Ponack, L.L.P.

(57) ABSTRACT

A projection optical system, in order from a magnification side to a demagnification side, comprising a negative first lens unit, a positive second lens unit, a positive third lens unit, a fourth lens unit, a fifth lens unit, and a sixth lens unit, wherein the second and third lens units move along an optical axis in zooming, the first lens unit moves along the optical axis in focusing, and the conditions: $-0.55 < f_W/f_1 < -0.30$ and $1.9 < f_{123T}/f_{123W} < f_T/f_W$ ($f_1$: focal length of first lens unit, $f_{123W}$: composite focal length of first, second and third lens units at wide-angle limit, $f_{123T}$: composite focal length of first, second and third lens units at telephoto limit, $f_W$: focal length of entire system at wide-angle limit, $f_T$: focal length of entire system at telephoto limit) are satisfied.

5 Claims, 7 Drawing Sheets

(56) References Cited

U.S. PATENT DOCUMENTS

2005/0200967 A1 9/2005 Yamasaki et al.
2011/0109975 A1 5/2011 Amano

FOREIGN PATENT DOCUMENTS

JP 2005-257896 9/2005
JP 2011-100079 5/2011

* cited by examiner

PROJECTION OPTICAL SYSTEM AND PROJECTION APPARATUS

CROSS-REFERENCE TO RELATED APPLICATION

This application is based on application No. 2014-025357 filed in Japan on Feb. 13, 2014, the contents of which are hereby incorporated by reference.

BACKGROUND

1. Field

The present disclosure relates to projection optical systems and projection apparatuses.

2. Description of the Related Art

Conventionally, for example, Japanese Laid-Open Patent Publication No. 2005-257896 discloses a projection optical system of a six-unit configuration in which, in zooming, first and sixth lens units are fixed, and second to fifth lens units move.

Besides Japanese Laid-Open Patent Publication No. 2005-257896, there are Japanese Laid-Open Patent Publications Nos. 2003-015037, 2001-235679, 2004-138640, and 2011-100079 related to projection optical systems.

SUMMARY

The present disclosure provides a high-performance projection optical system having a shorter overall length of lens system and a higher variable magnification ratio, in which occurrences of various aberrations are sufficiently suppressed. In addition, the present disclosure provides a projection apparatus including the projection optical system.

The novel concepts disclosed herein were achieved in order to solve the foregoing problems in the related art, and herein is disclosed:

a projection optical system, in order from a magnification side to a demagnification side, comprising a first lens unit having negative optical power, a second lens unit having positive optical power, a third lens unit having positive optical power, a fourth lens unit having optical power, a fifth lens unit having optical power, and a sixth lens unit having optical power, wherein in zooming from a wide-angle limit to a telephoto limit, the second lens unit and the third lens unit move along an optical axis, in focusing from a far point in-focus condition to a near point in-focus condition, the first lens unit moves along the optical axis, and the following conditions (1) and (2) are satisfied:

$$-0.55 < f_W/f_1 < -0.30 \tag{1}$$

$$1.9 < f_{123T}/f_{123W} < f_T/f_W \tag{2}$$

where
$f_1$ is a focal length of the first lens unit,
$f_{123W}$ is a composite focal length of the first lens unit, the second lens unit, and the third lens unit at the wide-angle limit,
$f_{123T}$ is a composite focal length of the first lens unit, the second lens unit, and the third lens unit at the telephoto limit,
$f_W$ is a focal length of the projection optical system at the wide-angle limit, and
$f_T$ is a focal length of the projection optical system at the telephoto limit.

The novel concepts disclosed herein were achieved in order to solve the foregoing problems in the related art, and herein is disclosed:

a projection apparatus comprising:
a projection optical system;
a light source section; and
a light valve placed at a conjugate point on the demagnification side of the projection optical system, the light valve spatially modulating light from the light source section;

the projection optical system, in order from a magnification side to a demagnification side, comprising a first lens unit having negative optical power, a second lens unit having positive optical power, a third lens unit having positive optical power, a fourth lens unit having optical power, a fifth lens unit having optical power, and a sixth lens unit having optical power, wherein in zooming from a wide-angle limit to a telephoto limit, the second lens unit and the third lens unit move along an optical axis, in focusing from a far point in-focus condition to a near point in-focus condition, the first lens unit moves along the optical axis, and the following conditions (1) and (2) are satisfied:

$$-0.55 < f_W/f_1 < -0.30 \tag{1}$$

$$1.9 < f_{123T}/f_{123W} < f_T/f_W \tag{2}$$

where
$f_1$ is a focal length of the first lens unit,
$f_{123W}$ is a composite focal length of the first lens unit, the second lens unit, and the third lens unit at the wide-angle limit,
$f_{123T}$ is a composite focal length of the first lens unit, the second lens unit, and the third lens unit at the telephoto limit,
$f_W$ is a focal length of the projection optical system at the wide-angle limit, and
$f_T$ is a focal length of the projection optical system at the telephoto limit.

The projection optical system according to the present disclosure is a high-performance projection optical system having a shorter overall length of lens system and a higher variable magnification ratio, in which occurrences of various aberrations are sufficiently suppressed.

BRIEF DESCRIPTION OF THE DRAWINGS

This and other objects and features of the present disclosure will become clear from the following description, taken in conjunction with the exemplary embodiments with reference to the accompanied drawings in which.

DETAILED DESCRIPTION

Hereinafter, embodiments will be described with reference to the drawings as appropriate. However, descriptions more detailed than necessary may be omitted. For example, detailed description of already well known matters or description of substantially identical configurations may be omitted. This is intended to avoid redundancy in the description below, and to facilitate understanding of those skilled in the art.

It should be noted that the applicant provides the attached drawings and the following description so that those skilled in the art can fully understand this disclosure. Therefore, the drawings and description are not intended to limit the subject defined by the claims.

In the present disclosure, a lens unit is a unit composed of at least one lens element. The optical power, the composite focal length, and the like of each lens unit are determined in accordance with the type, the number, the arrangement, and the like of the lens elements constituting the lens unit.

Embodiments 1 to 3

Projection Optical System

Figure 1:
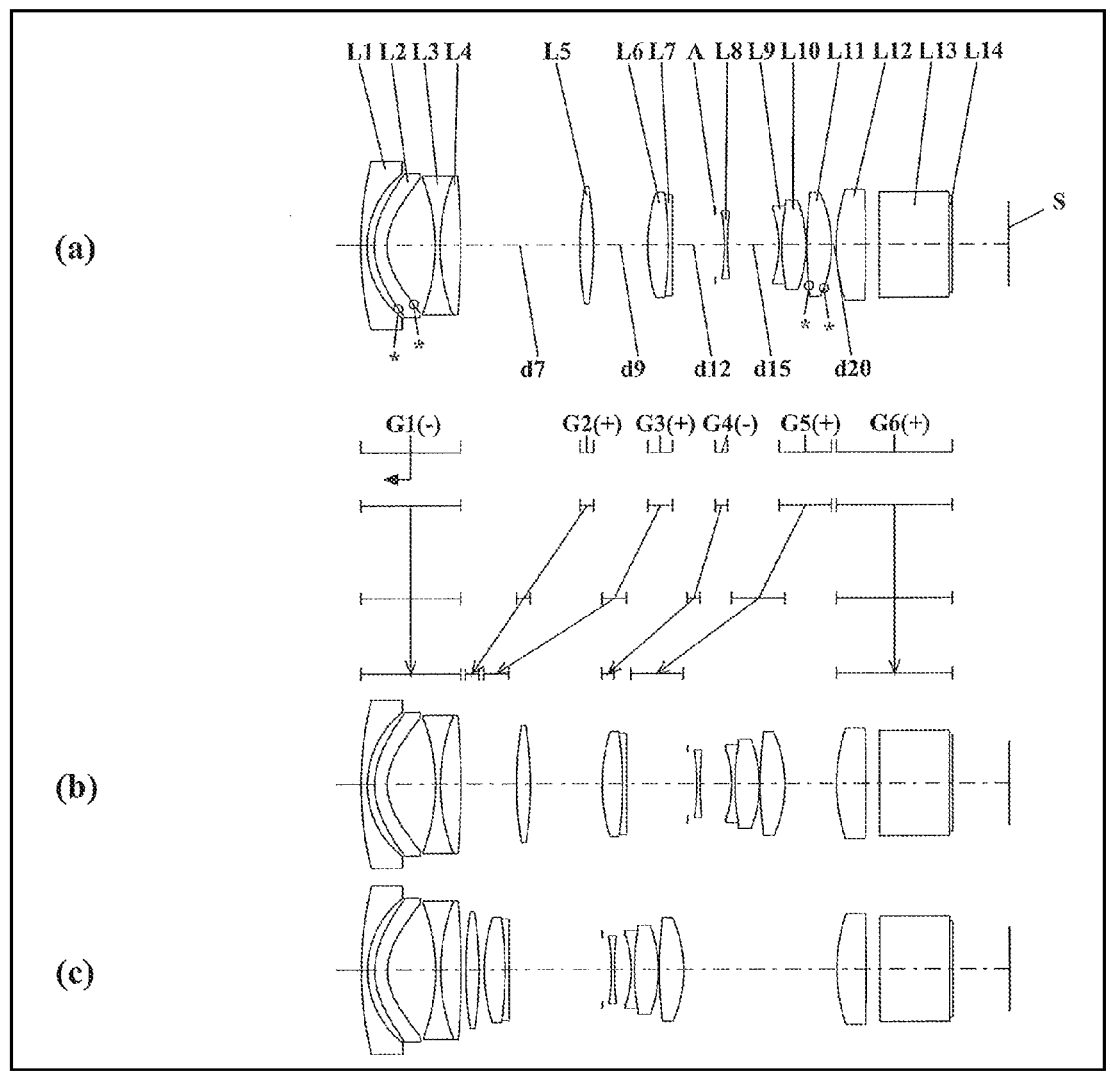
FIG. 1 is a lens arrangement diagram showing a far point in-focus condition of a projection optical system according to Embodiment 1 (Numerical Example 1)
Figure 3:
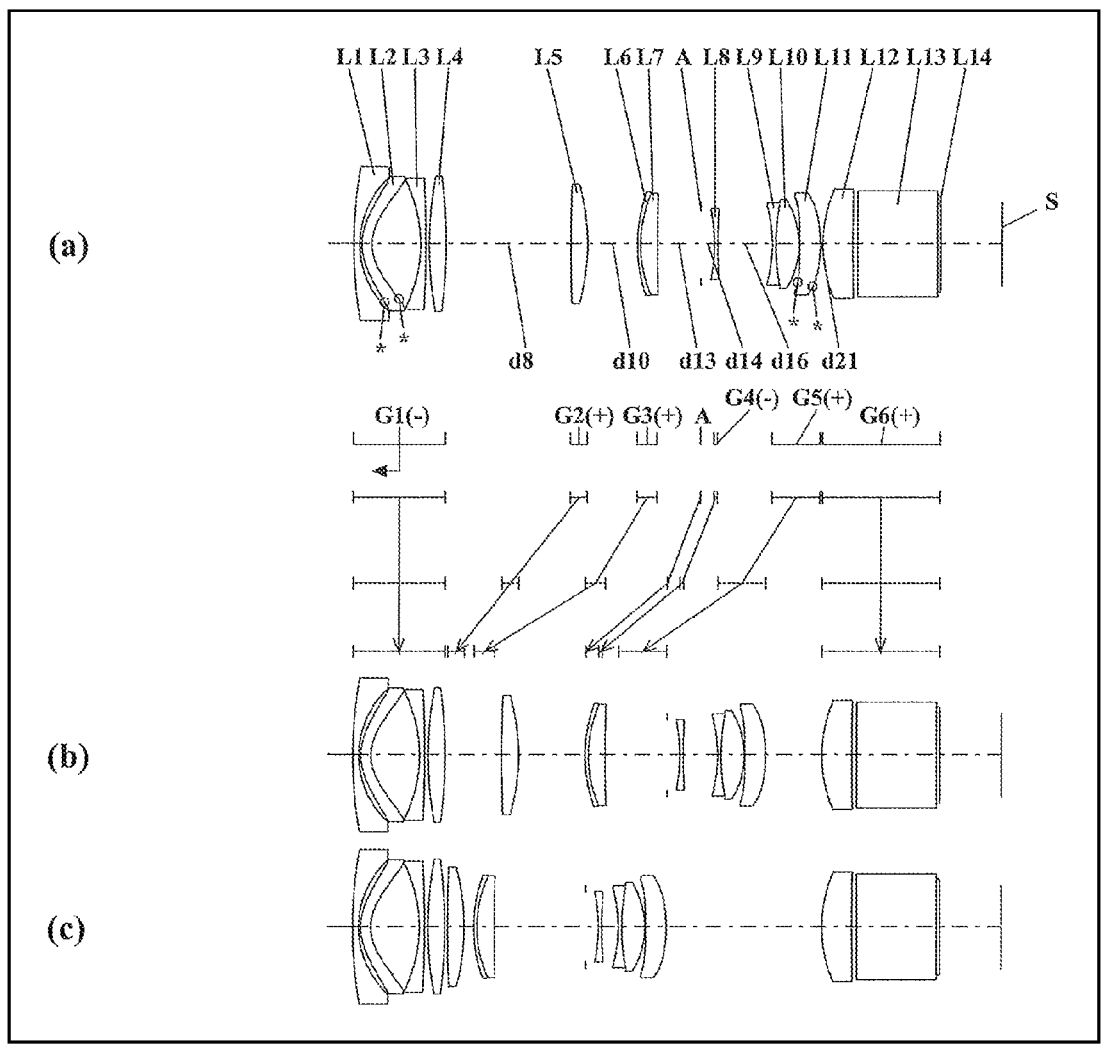
FIG. 3 is a lens arrangement diagram showing a far point in-focus condition of a projection optical system according to Embodiment 2 (Numerical Example 2)
Figure 5:
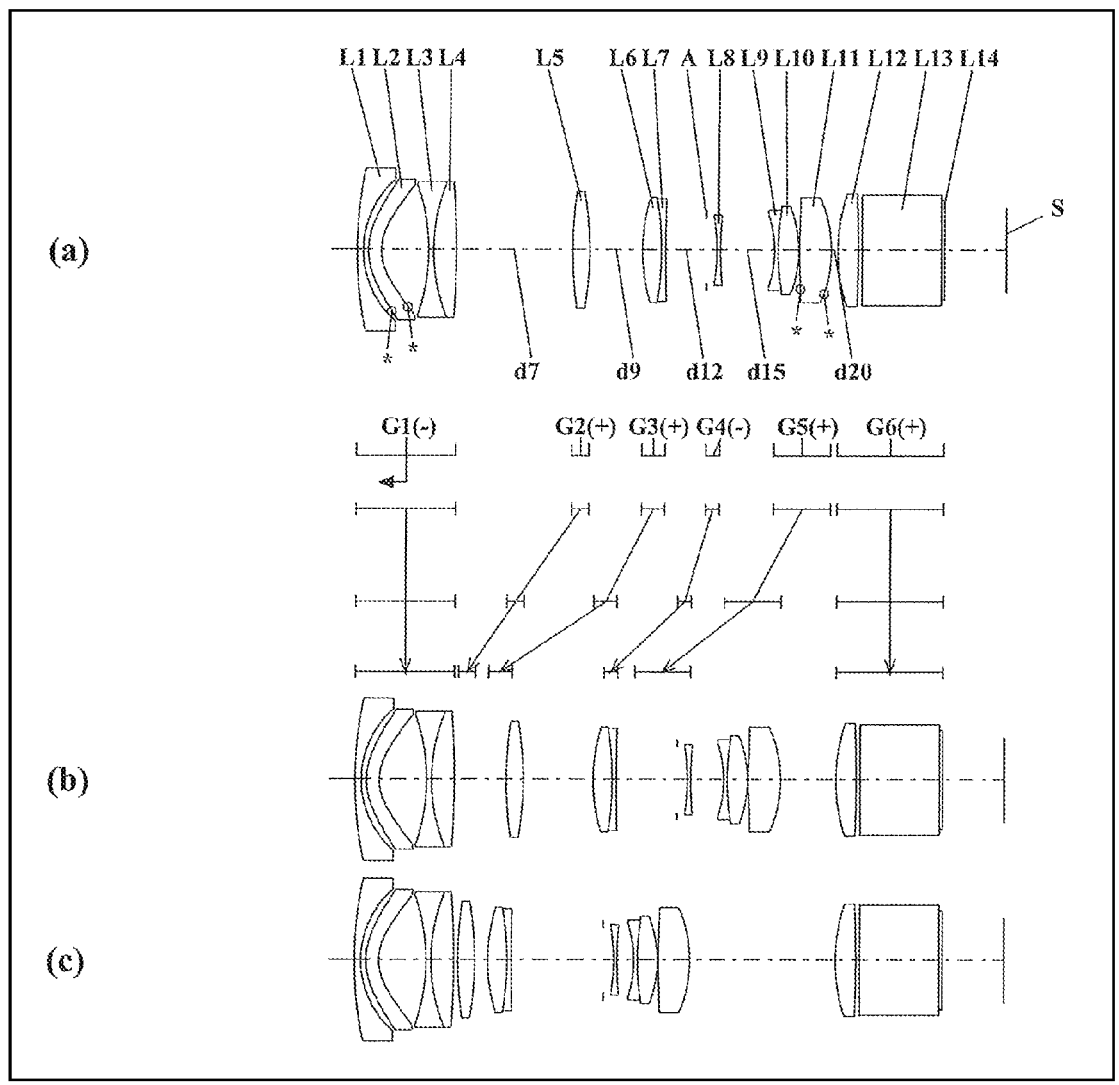
FIG. 5 is a lens arrangement diagram showing a far point in-focus condition of a projection optical system according to Embodiment 3 (Numerical Example 3)

FIGS. 1, 3 and 5 are lens arrangement diagrams of projection optical systems according to Embodiments 1 to 3, respectively. Each projection optical system is in a far point in-focus condition.

In each Fig., part (a) shows a lens configuration at a wide-angle limit (in the minimum focal length condition: focal length $f_W$), part (b) shows a lens configuration at a middle position (in an intermediate focal length condition: focal length $f_M = \sqrt(f_W * f_T)$), and part (c) shows a lens configuration at a telephoto limit (in the maximum focal length condition: focal length $f_T$). In each Fig., each bent arrow located between part (a) and part (b) indicates a line obtained by connecting the positions of each lens unit respectively at a wide-angle limit, a middle position and a telephoto limit, in order from the top. In the part between the wide-angle limit and the middle position and the part between the middle position and the telephoto limit, the positions are connected simply with a straight line, and hence this line does not indicate actual motion of each lens unit.

In each Fig., an arrow imparted to a lens unit indicates focusing from a far point in-focus condition to a near point in-focus condition. That is, in FIGS. 1, 3 and 5, the arrow indicates a direction along which a first lens unit G1 described later moves in focusing from a far point in-focus condition to a near point in-focus condition. In FIGS. 1, 3 and 5, since the symbols of the respective lens units are imparted to part (a), the arrow indicating focusing is placed beneath each symbol of each lens unit for the convenience sake. However, the direction along which each lens unit moves in focusing in each zooming condition will be hereinafter described in detail for each embodiment.

In FIGS. 1, 3 and 5, an asterisk "*" imparted to a particular surface indicates that the surface is aspheric. In each Fig., symbol (+) or (−) imparted to the symbol of each lens unit corresponds to the sign of the optical power of the lens unit. In each Fig., the straight line located on the most right-hand side indicates the position of a conjugate point S on the demagnification side. At the conjugate point S on the demagnification side, a light valve of a projection apparatus is provided as described later. On the magnification side of the conjugate point S on the demagnification side, a glass block L13 such as a color synthetic prism, and a parallel plate L14 such as a glass plate for protecting the light valve are provided.

As shown in FIGS. 1 and 5, on the most magnification side in a fourth lens unit G4, an aperture A is provided. In addition, as shown in FIG. 3, an aperture A is provided between a third lens unit G3 and the fourth lens unit G4. The aperture A is a member for regulating an optical axial light beam in the projection optical system. A diaphragm may be used instead of the aperture A.

Embodiment 1

FIG. 1 is a lens arrangement diagram showing a far point in-focus condition of a projection optical system according to Embodiment 1.

The projection optical system, in order from the magnification side to the demagnification side, comprises a first lens unit G1 having negative optical power, a second lens unit G2 having positive optical power, a third lens unit G3 having positive optical power, a fourth lens unit G4 having negative optical power, a fifth lens unit G5 having positive optical power, and a sixth lens unit G6 having positive optical power.

The first lens unit G1, in order from the magnification side to the demagnification side, comprises a first lens element L1 having negative optical power, a second lens element L2 having negative optical power, a third lens element L3 having negative optical power, and a fourth lens element L4 having positive optical power.

The first lens element L1 is a meniscus lens with the convex surface facing the magnification side. The second lens element L2 is a meniscus lens with the convex surface facing the magnification side. The third lens element L3 is a concave lens. The fourth lens element L4 is a convex lens. The third lens element L3 and the fourth lens element L4 are cemented with each other to form a cemented lens.

The second lens unit G2 comprises a fifth lens element L5 having positive optical power. The fifth lens element L5 is a convex lens.

The third lens unit G3, in order from the magnification side to the demagnification side, comprises a sixth lens element L6 having positive optical power, and a seventh lens element L7 having negative optical power.

The sixth lens element L6 is a convex lens. The seventh lens element L7 is a concave lens. The sixth lens element L6 and the seventh lens element L7 are cemented with each other to form a cemented lens.

The fourth lens unit G4, in order from the magnification side to the demagnification side, comprises an aperture A, and an eighth lens element L8 having negative optical power. The eighth lens element L8 is a concave lens.

The fifth lens unit G5, in order from the magnification side to the demagnification side, comprises a ninth lens element L9 having negative optical power, a tenth lens element L10 having positive optical power, and an eleventh lens element L11 having positive optical power.

The ninth lens element L9 is a concave lens. The tenth lens element L10 is a convex lens. The ninth lens element L9 and the tenth lens element L10 are cemented with each other to form a cemented lens. The eleventh lens element L11 is a convex lens.

The sixth lens unit G6 comprises a twelfth lens element L12 having positive optical power. The twelfth lens element L12 is a convex lens.

Both surfaces of the second lens element L2 and both surfaces of the eleventh lens element L11 are aspheric.

On the magnification side of the conjugate point S on the demagnification side (between the conjugate point S on the demagnification side and the twelfth lens element L12), a glass block L13 and a parallel plate L14 are placed in order from the magnification side to the demagnification side.

In zooming from a wide-angle limit to a telephoto limit, the second lens unit G2, the third lens unit G3, the fourth lens unit G4, and the fifth lens unit G5 move to the magnification side along the optical axis. In the zooming, the aperture A moves integrally with the fourth lens unit G4 along the optical axis. In the zooming, the first lens unit G1 and the sixth lens unit G6 are fixed and do not move.

In focusing from a far point in-focus condition to a near point in-focus condition, the first lens unit G1 moves to the magnification side along the optical axis in any zooming condition. In the focusing, the second lens unit G2, the third lens unit G3, the fourth lens unit G4, the fifth lens unit G5, and the sixth lens unit G6 do not move.

Embodiment 2

FIG. 3 is a lens arrangement diagram showing a far point in-focus condition of a projection optical system according to Embodiment 2.

The projection optical system, in order from the magnification side to the demagnification side, comprises a first lens unit G1 having negative optical power, a second lens unit G2 having positive optical power, a third lens unit G3 having positive optical power, a fourth lens unit G4 having negative optical power, a fifth lens unit G5 having positive optical power, and a sixth lens unit G6 having positive optical power.

The first lens unit G1, in order from the magnification side to the demagnification side, comprises a first lens element L1 having negative optical power, a second lens element L2 having negative optical power, a third lens element L3 having negative optical power, and a fourth lens element L4 having positive optical power.

The first lens element L1 is a meniscus lens with the convex surface facing the magnification side. The second lens element L2 is a meniscus lens with the convex surface facing the magnification side. The third lens element L3 is a meniscus lens with the concave surface facing the magnification side. The fourth lens element L4 is a convex lens.

The second lens unit G2 comprises a fifth lens element L5 having positive optical power. The fifth lens element L5 is a convex lens.

The third lens unit G3, in order from the magnification side to the demagnification side, comprises a sixth lens element L6 having negative optical power, and a seventh lens element L7 having positive optical power.

The sixth lens element L6 is a meniscus lens with the convex surface facing the magnification side. The seventh lens element L7 is a meniscus lens with the convex surface facing the magnification side. The sixth lens element L6 and the seventh lens element L7 are cemented with each other to form a cemented lens.

The fourth lens unit G4 comprises an eighth lens element L8 having negative optical power. The eighth lens element L8 is a concave lens. An aperture A is placed on the magnification side of the eighth lens element L8.

The fifth lens unit G5, in order from the magnification side to the demagnification side, comprises a ninth lens element L9 having negative optical power, a tenth lens element L10 having positive optical power, and an eleventh lens element L11 having positive optical power.

The ninth lens element L9 is a concave lens. The tenth lens element L10 is a convex lens. The ninth lens element L9 and the tenth lens element L10 are cemented with each other to form a cemented lens. The eleventh lens element L11 is a meniscus lens with the concave surface facing the magnification side.

The sixth lens unit G6 comprises a twelfth lens element L12 having positive optical power. The twelfth lens element L12 is a meniscus lens with the convex surface facing the magnification side.

The both surfaces of the second lens element L2 and the both surfaces of the eleventh lens element L11 are aspheric.

On the magnification side of the conjugate point S on the demagnification side (between the conjugate point S on the demagnification side and the twelfth lens element L12), a glass block L13 and a parallel plate L14 are placed in order from the magnification side to the demagnification side.

In zooming from a wide-angle limit to a telephoto limit, the second lens unit G2, the third lens unit G3, the fourth lens unit G4, and the fifth lens unit G5 move to the magnification side along the optical axis. In the zooming, the aperture A moves independently from the fourth lens unit G4 to the magnification side along the optical axis. In the zooming, the first lens unit G1 and the sixth lens unit G6 are fixed and do not move.

In focusing from a far point in-focus condition to a near point in-focus condition, the first lens unit G1 moves to the magnification side along the optical axis in any zooming condition. In the focusing, the second lens unit G2, the third lens unit G3, the fourth lens unit G4, the fifth lens unit G5, and the sixth lens unit G6 do not move.

Embodiment 3

FIG. 5 is a lens arrangement diagram showing a far point in-focus condition of a projection optical system according to Embodiment 3.

The projection optical system, in order from the magnification side to the demagnification side, comprises a first lens unit G1 having negative optical power, a second lens unit G2 having positive optical power, a third lens unit G3 having positive optical power, a fourth lens unit G4 having negative optical power, a fifth lens unit G5 having positive optical power, and a sixth lens unit G6 having positive optical power.

The first lens unit G1, in order from the magnification side to the demagnification side, comprises a first lens element L1 having negative optical power, a second lens element L2 having negative optical power, a third lens element L3 having negative optical power, and a fourth lens element L4 having positive optical power.

The first lens element L1 is a meniscus lens with the convex surface facing the magnification side. The second lens element L2 is a meniscus lens with the convex surface facing the magnification side. The third lens element L3 is a concave lens. The fourth lens element L4 is a convex lens. The third lens element L3 and the fourth lens element L4 are cemented with each other to form a cemented lens.

The second lens unit G2 comprises a fifth lens element L5 having positive optical power. The fifth lens element L5 is a convex lens.

The third lens unit G3, in order from the magnification side to the demagnification side, comprises a sixth lens element L6 having positive optical power, and a seventh lens element L7 having negative optical power.

The sixth lens element L6 is a convex lens. The seventh lens element L7 is a concave lens. The sixth lens element L6 and the seventh lens element L7 are cemented with each other to form a cemented lens.

The fourth lens unit G4, in order from the magnification side to the demagnification side, comprises an aperture A, and an eighth lens element L8 having negative optical power. The eighth lens element L8 is a concave lens.

The fifth lens unit G5, in order from the magnification side to the demagnification side, comprises a ninth lens element L9 having negative optical power, a tenth lens element L10 having positive optical power, and an eleventh lens element L11 having positive optical power.

The ninth lens element L9 is a concave lens. The tenth lens element L10 is a convex lens. The ninth lens element L9 and the tenth lens element L10 are cemented with each other to form a cemented lens. The eleventh lens element L11 is a convex lens.

The sixth lens unit G6 comprises a twelfth lens element L12 having positive optical power. The twelfth lens element L12 is a convex lens.

Both surfaces of the second lens element L2 and both surfaces of the eleventh lens element L11 are aspheric.

On the magnification side of the conjugate point S on the demagnification side (between the conjugate point S on the demagnification side and the twelfth lens element L12), a glass block L13 and a parallel plate L14 are placed in order from the magnification side to the demagnification side.

In zooming from a wide-angle limit to a telephoto limit, the second lens unit G2, the third lens unit G3, the fourth lens unit G4, and the fifth lens unit G5 move to the magnification side along the optical axis. In the zooming, the aperture A moves integrally with the fourth lens unit G4 along the optical axis. In the zooming, the first lens unit G1 and the sixth lens unit G6 are fixed and do not move.

In focusing from a far point in-focus condition to a near point in-focus condition, the first lens unit G1 moves to the magnification side along the optical axis in any zooming condition. In the focusing, the second lens unit G2, the third lens unit G3, the fourth lens unit G4, the fifth lens unit G5, and the sixth lens unit G6 do not move.

As described above, Embodiments 1 to 3 have been described as examples of art disclosed in the present application. However, the art in the present disclosure is not limited to these embodiments. It is understood that various modifications, replacements, additions, omissions, and the like have been performed in these embodiments to give optional embodiments, and the art in the present disclosure can be applied to the optional embodiments.

The following description is given for beneficial conditions that a projection optical system like the projection optical systems according to Embodiments 1 to 3 can satisfy. Here, a plurality of beneficial conditions is set forth for the projection optical system according to each embodiment. A configuration that satisfies all the plurality of conditions is most effective for the projection optical system. However, when an individual condition is satisfied, a projection optical system having the corresponding effect is obtained.

For example, like the projection optical systems according to Embodiments 1 to 3, the projection optical system according to the present disclosure, in order from the magnification side to the demagnification side, comprises the first lens unit having negative optical power, the second lens unit having positive optical power, the third lens unit having positive optical power, the fourth lens unit having optical power, the fifth lens unit having optical power, and the sixth lens unit having optical power. In zooming from a wide-angle limit to a telephoto limit, the second lens unit and the third lens unit move along the optical axis. In focusing from a far point in-focus condition to a near point in-focus condition, the first lens unit moves along the optical axis. Hereinafter, this lens configuration is referred to as a basic configuration of the embodiments.

The projection optical system having the basic configuration satisfies the following conditions (1) and (2):

$$-0.55 < f_W/f_1 < -0.30 \quad (1)$$

$$1.9 < f_{123T}/f_{123W} < f_T/f_W \quad (2)$$

where $f_1$ is the focal length of the first lens unit, $f_{123W}$ is the composite focal length of the first lens unit, the second lens unit, and the third lens unit at the wide-angle limit, $f_{123T}$ is the composite focal length of the first lens unit, the second lens unit, and the third lens unit at the telephoto limit, $f_W$ is the focal length of the projection optical system at the wide-angle limit, and $f_T$ is the focal length of the projection optical system at the telephoto limit.

The condition (1) sets forth a ratio between the focal length of the entire projection optical system at the wide-angle limit and the focal length of the first lens unit. When the value goes below the lower limit of the condition (1), the power of the first lens unit to bend a light beam at the wide-angle limit is reduced, and thereby the variable magnification ratio is lowered. If it is attempted to increase the variable magnification ratio in the state where the value goes below the lower limit of the condition (1), the outer diameter of the first lens unit is increased. When the value exceeds the upper limit of the condition (1), the imaging lateral magnification of the lens units placed on the demagnification side relative to the first lens unit is increased, which makes it difficult to compensate various aberrations, particularly coma aberration at the telephoto limit. In other words, when the condition (1) is satisfied, size reduction of the projection optical system and sufficient compensation of various aberrations are realized.

When at least one of the following conditions (1)' and (1)" is satisfied, the above-mentioned effect is achieved more successfully.

$$-0.50 < f_W/f_1 \quad (1)'$$

$$f_W/f_1 < -0.35 \quad (1)''$$

The condition (2) sets forth a ratio between the composite focal length of the first lens unit, the second lens unit, and the third lens unit at the telephoto limit and the composite focal length of the first lens unit, the second lens unit, and the third lens unit at the wide-angle limit. When the value goes below the lower limit of the condition (2), it becomes difficult to provide a telecentric optical system. For example, it becomes difficult to set the variable magnification ratio to two times or more. When the value exceeds the upper limit of the condition (2), it becomes difficult to compensate various aberrations, particularly coma aberrations of the second lens unit and the third lens unit, which may result in degraded imaging performance of the entire projection optical system. In other words, when the condition (2) is satisfied, the variable magnification ratio of the projection optical system is further increased, and various aberrations are sufficiently compensated.

When at least one of the following conditions (2)' and (2)" is satisfied, the above-mentioned effect is achieved more successfully.

$$2.0 < f_{123T}/f_{123W} \quad (1)'$$

$$f_{123T}/f_{123W} < 0.98 \times (f_T/f_W) \quad (2)''$$

For example, in the projection optical system having the basic configuration of the present disclosure like the projection optical systems according to Embodiments 1 to 3, it is beneficial that the number of the lens elements constituting the second lens unit and the third lens unit is three in total, one of the second and third lens units is composed of one lens element while the other of the second and third lens units is composed of one lens element having negative optical power and one lens element having positive optical power, and the following conditions (3) and (4) are satisfied:

$$0.5 < D_{23W}/f_W < 1.0 \tag{3}$$

$$0.01 < D_{23T}/f_T < 0.10 \tag{4}$$

where $D_{23W}$ is the optical axial interval at the wide-angle limit between a lens surface, closest to the demagnification side, of the second lens unit and a lens surface, closest to the magnification side, of the third lens unit, and $D_{23T}$ is the optical axial interval at the telephoto limit between the lens surface, closest to the demagnification side, of the second lens unit and the lens surface, closest to the magnification side, of the third lens unit.

The condition (3) sets forth a ratio between the optical axial interval at the wide-angle limit between a lens surface, closest to the demagnification side, of the second lens unit and a lens surface, closest to the magnification side, of the third lens unit, and the focal length of the entire projection optical system at the wide-angle limit. When the value goes below the lower limit of the condition (3), it becomes difficult to compensate coma aberration of the second lens unit, and thereby the imaging performance of the entire projection optical system is degraded. When the value exceeds the upper limit of the condition (3), it becomes difficult to compensate coma aberration of the third lens unit, and thereby the imaging performance of the entire projection optical system is degraded. In other words, when the condition (3) is satisfied, it is possible to realize a projection optical system in which occurrences of various aberrations are suppressed.

When at least one of the following conditions (3)' and (3)" is satisfied, the above-mentioned effect is achieved more successfully.

$$0.6 < D_{23W}/f_W \tag{3)'}$$

$$D_{23W}/f_W < 0.8 \tag{3)''}$$

The condition (4) sets forth a ratio between the optical axial interval at the telephoto limit between a lens surface, closest to the demagnification side, of the second lens unit and a lens surface, closest to the magnification side, of the third lens unit, and the focal length of the entire projection optical system at the telephoto limit. When the value goes below the lower limit of the condition (4), the interval between the second lens unit and the third lens unit is reduced, which makes it difficult to manufacture the optical system. When the value exceeds the upper limit of the condition (4), it becomes difficult to compensate coma aberration of the third lens unit, and thereby the imaging performance of the entire projection optical system is degraded. In other words, when the condition (4) is satisfied, it is possible to realize a projection optical system which is easily manufactured and in which occurrences of various aberrations are suppressed.

When at least one of the following conditions (4)' and (4)" is satisfied, the above-mentioned effect is achieved more successfully.

$$0.02 < D_{23T}/f_T \tag{4)'}$$

$$D_{23T}/f_T < 0.08 \tag{4)''}$$

In the projection optical system wherein one of the second and third lens units is composed of one lens element while the other of the second and third lens units is composed of one lens element having negative optical power and one lens element having positive optical power, when the second lens unit is composed of one lens element while the third lens unit is composed of one lens element having negative optical power and one lens element having positive optical power, the projection optical system has the following advantages. In other words, the second lens unit has weak optical power and shows less chromatic aberration, and thereby compensation of the aberration is not needed. In addition, the amount of movement of the second lens unit in the zooming can be increased, and thereby the projection optical system having a high zooming ratio is realized. The third lens unit has stronger optical power than the second lens unit, and thereby the third lens unit is valuable for compensation of chromatic aberration. In the same way as the second lens unit, in order to realize the projection optical system having a high zooming ratio by increasing the amount of movement of the third lens unit in the zooming, it is beneficial that thickness of the third lens unit is decreased as much as possible.

For example, in the projection optical system having the basic configuration of the present disclosure like the projection optical systems according to Embodiments 1 to 3, it is beneficial that the fourth lens unit has negative optical power, and is composed of one lens element, the aperture that regulates an optical axial light beam is placed at a position closest to the magnification side in the fourth lens unit, or between the third lens unit and the fourth lens unit, and the following condition (5) is satisfied:

$$-0.8 < (R_{41}+R_{42})/(R_{41}-R_{42}) < 0.2 \tag{5}$$

where $R_{41}$ is the radius of curvature of a lens surface, on the magnification side, of the lens element constituting the fourth lens unit, and $R_{42}$ is the radius of curvature of a lens surface, on the demagnification side, of the lens element constituting the fourth lens unit.

The condition (5) sets forth the shape factor of the lens element constituting the fourth lens unit, and sets forth high resolution performance. When the value goes below the lower limit of the condition (5), reduction in the performance caused by decentering of the fourth lens unit due to manufacturing error becomes significant, which makes it difficult to manufacture the optical system. When the value exceeds the upper limit of the condition (5), it becomes difficult to compensate astigmatism at the wide-angle limit, and thereby the peripheral performance is degraded. In other words, when the condition (5) is satisfied, it is possible to realize a projection optical system which is easily manufactured and in which occurrences of various aberrations are suppressed.

When at least one of the following conditions (5)' and (5)" is satisfied, the above-mentioned effect is achieved more successfully.

$$-0.65 < (R_{41}+R_{42})/(R_{41}-R_{42}) \tag{5)'}$$

$$(R_{41}+R_{42})/(R_{41}-R_{42}) < 0.00 \tag{5)''}$$

In the projection optical system wherein the fourth lens unit has negative optical power and is composed of one lens element, when the fifth lens unit includes a lens element having negative optical power, negative optical power is divided into the second lens unit and the lens element constituting the third lens unit. As a result, effects are exhibited such that Petzval curvature of field is compensated, and occurrence of flare aberration in the peripheral part of the image is suppressed. The effects become greater when the aperture is placed on the magnification side relative to the one lens element constituting the fourth lens unit.

For example, in the projection optical system having the basic configuration of the present disclosure like the projection optical systems according to Embodiments 1 to 3, it is beneficial that the fifth lens unit has positive optical power, and comprises, in order from the magnification side to the demagnification side, a lens element A having negative optical power, a lens element B having positive optical power, and a lens element C having positive optical power, and the following conditions (6), (7) and (8) are satisfied:

$$0.0018 \times vd_A + PgF_A < 0.670 \quad (6)$$

$$0.0018 \times vd_B + PgF_B > 0.650 \quad (7)$$

$$0.0018 \times vd_C + PgF_C > 0.650 \quad (8)$$

where $vd_A$ is the Abbe number to the d-line of the lens element A,
$vd_B$ is the Abbe number to the d-line of the lens element B,
$vd_C$ is the Abbe number to the d-line of the lens element C,
$PgF_A$ is the partial dispersion ratio of the lens element A, which is the ratio of the difference between the refractive index to the g-line and the refractive index to the F-line, to the difference between the refractive index to the F-line and the refractive index to the C-line,
$PgF_B$ is the partial dispersion ratio of the lens element B, which is the ratio of the difference between the refractive index to the g-line and the refractive index to the F-line, to the difference between the refractive index to the F-line and the refractive index to the C-line, and
$PgF_C$ is the partial dispersion ratio of the lens element C, which is the ratio of the difference between the refractive index to the g-line and the refractive index to the F-line, to the difference between the refractive index to the F-line and the refractive index to the C-line.

The conditions (6), (7) and (8) set forth the partial dispersion ratios of the lens element A, the lens element B, and the lens element C, respectively, and set forth occurrence of chromatic aberration. When the conditions (6), (7) and (8) are satisfied, it is possible to realize a projection optical system in which occurrences of axial chromatic aberration and magnification chromatic aberration at (and in the vicinity of) the telephoto limit are suppressed.

When at least one of the following conditions (6)', (7)' and (8)' is satisfied, the above-mentioned effect is achieved more successfully.

$$0.0018 \times vd_A + PgF_A < 0.650 \quad (6)'$$

$$0.0018 \times vd_B + PgF_B > 0.670 \quad (7)'$$

$$0.0018 \times vd_C + PgF_C > 0.670 \quad (8)'$$

The fifth lens unit has a configuration of negative, positive, and positive, which is similar to Gauss type configuration. As a result, occurrences of various aberrations are suppressed from the center part to the peripheral part of the image, and the projection optical system showing high performances in all zooming areas can be realized.

The individual lens units constituting the projection optical systems according to Embodiments 1 to 3 are each composed exclusively of refractive type lens elements that deflect incident light by refraction (that is, lens elements of a type in which deflection is achieved at the interface between media having different refractive indices). However, the present disclosure is not limited to this construction. For example, the lens units may employ diffractive type lens elements that deflect incident light by diffraction; refractive-diffractive hybrid type lens elements that deflect incident light by a combination of diffraction and refraction; or gradient index type lens elements that deflect incident light by distribution of refractive index in the medium. In particular, in the refractive-diffractive hybrid type lens element, when a diffraction structure is formed in the interface between media having different refractive indices, wavelength dependence of the diffraction efficiency is improved. Thus, such a configuration is beneficial.

Embodiment 4

Projection Apparatus

Figure 7:
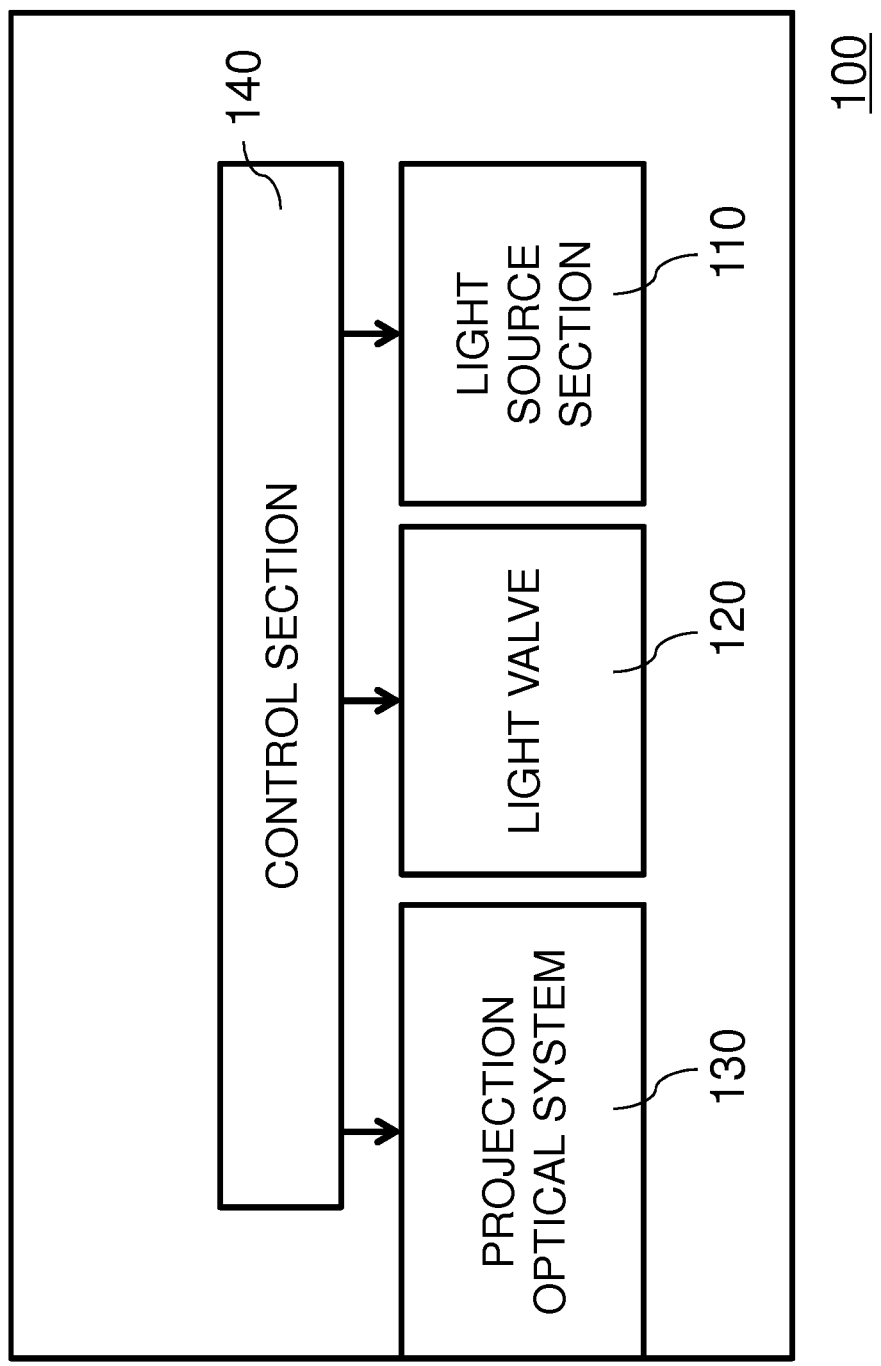
FIG. 7 is a schematic construction diagram of a projector to which the projection optical system according to Embodiment 1 is applied.

FIG. 7 is a schematic construction diagram of a projector as an example of a projection apparatus, to which the projection optical system according to Embodiment 1 is applied. In the projector according to Embodiment 4, the projection optical system according to Embodiment 2 or 3 may be applied instead of the projection optical system according to Embodiment 1.

The projector 100 according to Embodiment 4 includes a light source section 110, a light valve 120 that spatially modulates light from the light source section 110, a projection optical system 130, and a control section 140 that controls the respectively sections.

The light source section 110 includes a semiconductor laser, and makes a fluorescent material emit light, with light from the semiconductor laser being excitation light.

Various methods can be adopted for the light valve 120, such as an LCD method using a transmission type liquid crystal panel, a DLP method using a DLP chip, and an LCOS method using a reflection type liquid crystal panel. Generally, a light guide lens (not shown) is placed between the light source section 110 and the light valve 120, and guides light emitted from the light source section 110 to the light valve 120. The light guide lens is composed of optical members such as a mirror and a rod.

The projection optical system 130 enlarges and projects light spatially modulated by the light valve 120. The light valve 120 is placed at the conjugate point S on the demagnification side of the projection optical system 130.

The control section 140 is implemented by a CPU or the like, and controls the respective sections. For example, the control section 140 controls ON/OFF of a light source of the light source section 110. The control section 140 controls the light valve 120 to control the spatial modulation of light. The control section 140 controls the projection optical system 130 to make the second lens unit G2, the third lens unit G3, the fourth lens unit G4, and the fifth lens unit G5 move along the optical axis, thereby performing zooming, and make the first lens unit G1 move along the optical axis, thereby performing focusing.

As described above, Embodiment 4 have been described as examples of art disclosed in the present application. However, the art in the present disclosure is not limited to these embodiments. It is understood that various modifications, replacements, additions, omissions, and the like have been performed in these embodiments to give optional embodiments, and the art in the present disclosure can be applied to the optional embodiments.

Numerical examples are described below in which the projection optical systems according to Embodiments 1 to 3 are implemented. Here, in the numerical examples, the units of length are all "mm", while the units of view angle are all "°". Moreover, in the numerical examples, r is the radius of curvature, d is the axial distance, nd is the refractive index to the d-line, and vd is the Abbe number to the d-line.

In the numerical examples, nC is the refractive index to the C-line, nF is the refractive index to the F-line, and ng is the refractive index to the g-line. PgF is the partial dispersion ratio, which is the ratio of a difference between the refractive index to the g-line and the refractive index to the F-line, to a difference between the refractive index to the F-line and the refractive index to the C-line. The PgF is calculated in accordance with the following expression.

$$PgF=(ng-nF)/(nF-nC)$$

In the numerical examples, the surfaces marked with * are aspherical surfaces, and the aspherical surface configuration is defined by the following expression.

$$Z = \frac{h^2/r}{1+\sqrt{1-(1+\kappa)(h/r)^2}} + \sum A_n h^n$$

Here, the symbols in the formula indicate the following quantities.

Z is a distance from a point on an aspherical surface at a height h relative to the optical axis to a tangential plane at the vertex of the aspherical surface, h is a height relative to the optical axis, r is a radius of curvature at the top, κ is a conic constant, and $A_n$ is a n-th order aspherical coefficient.

Figure 2:
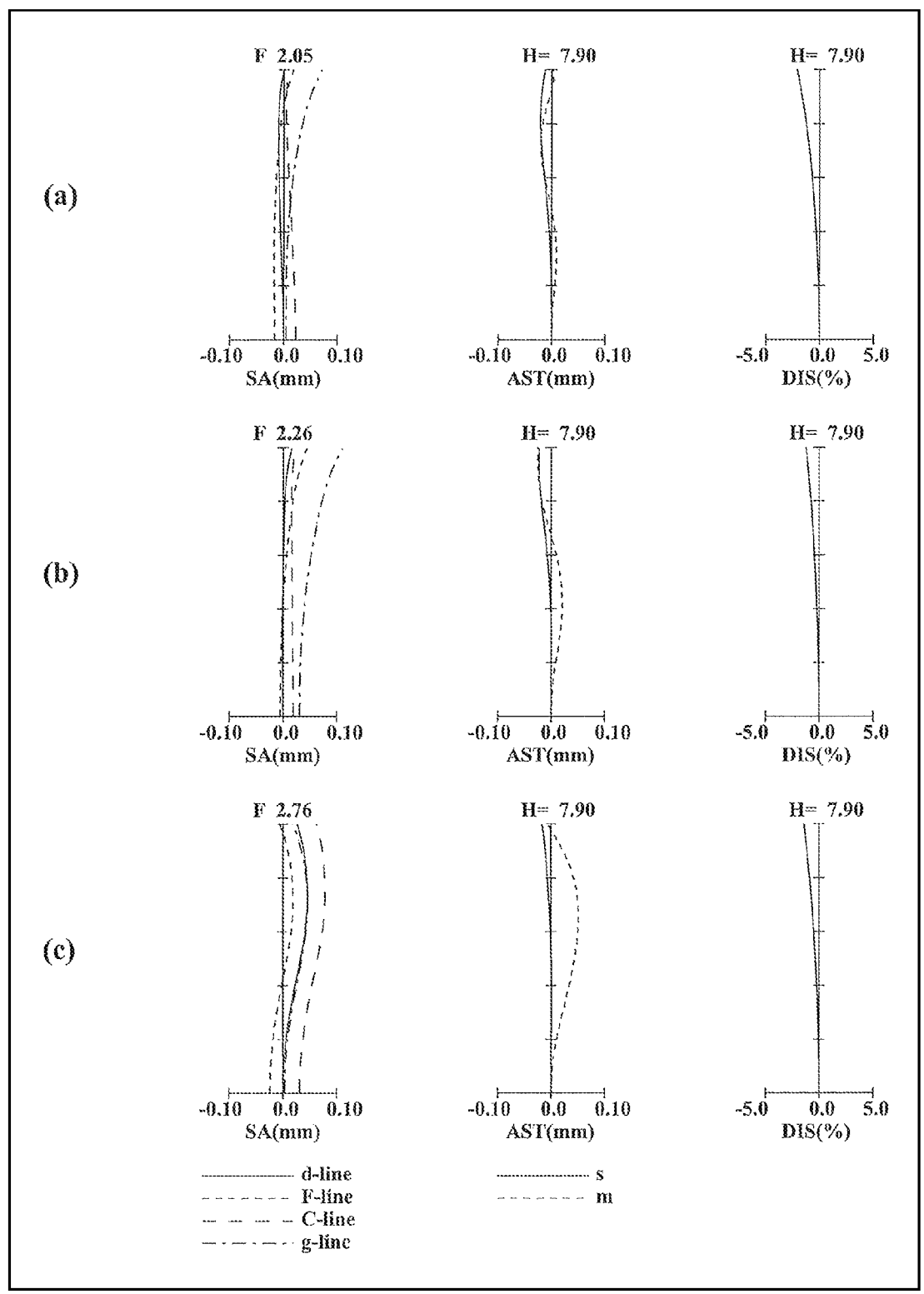
FIG. 2 is a longitudinal aberration diagram of the far point in-focus condition of the projection optical system according to Numerical Example 1.
Figure 4:
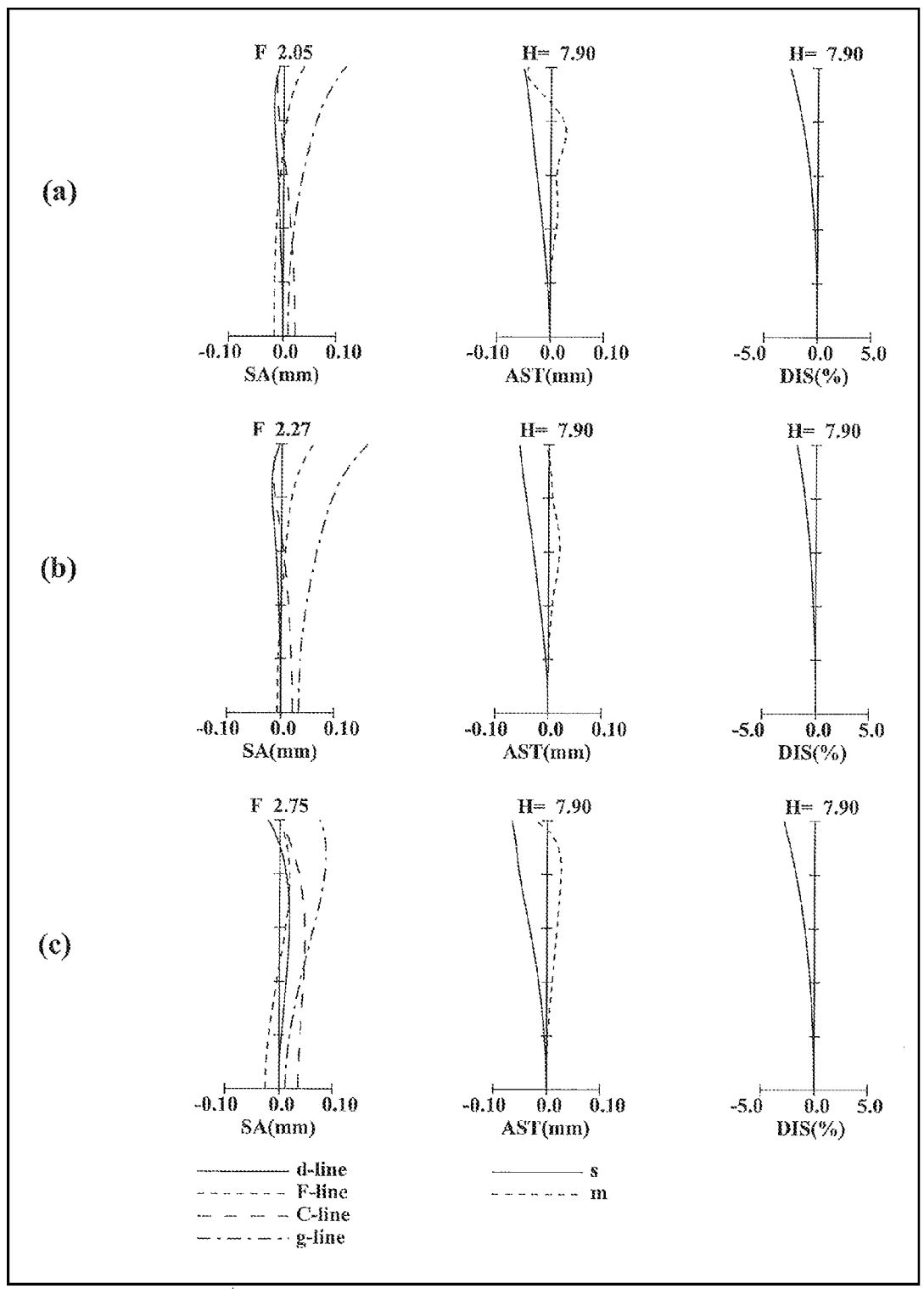
FIG. 4 is a longitudinal aberration diagram of the far point in-focus condition of the projection optical system according to Numerical Example 2.
Figure 6:
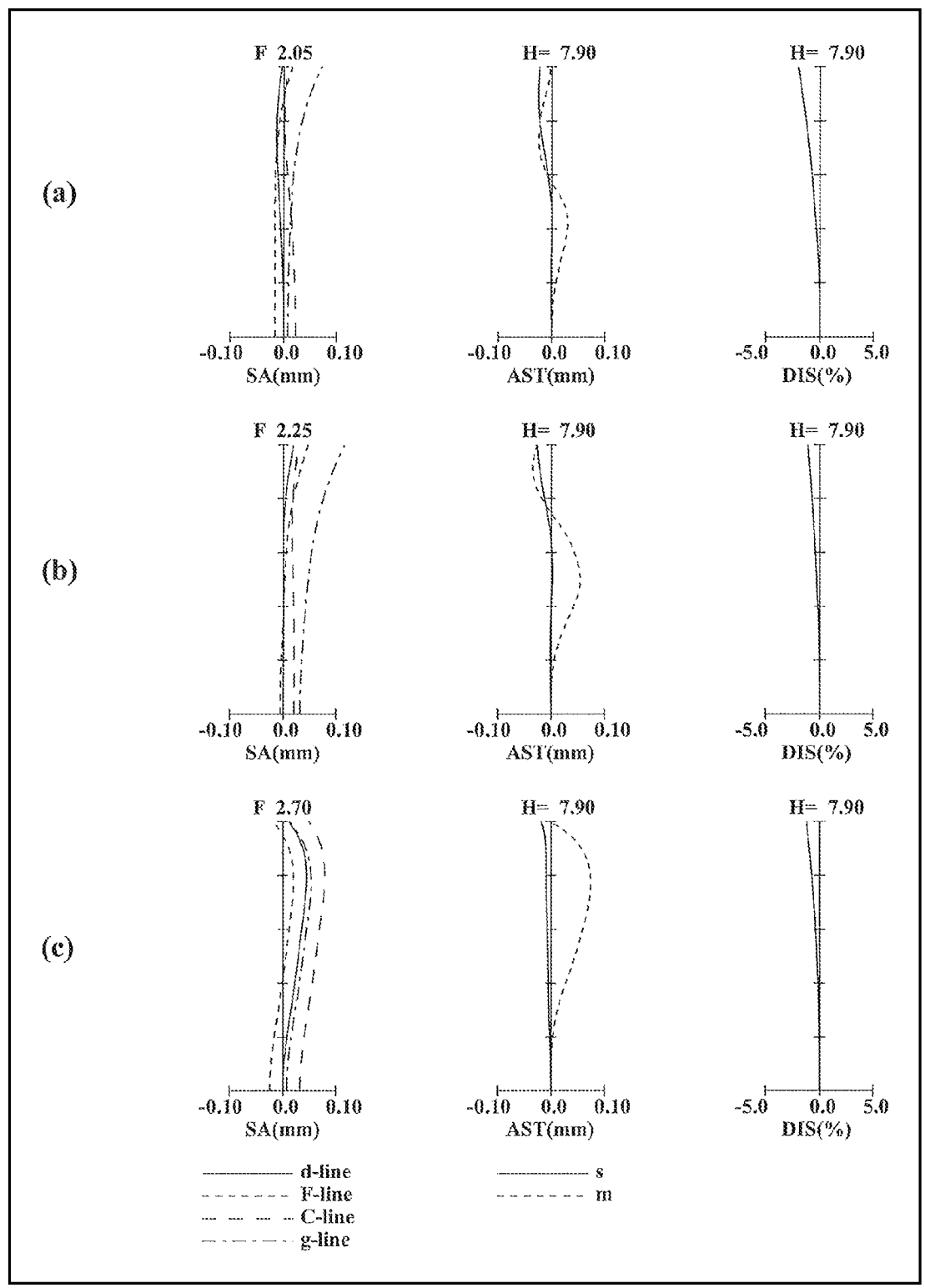
FIG. 6 is a longitudinal aberration diagram of the far point in-focus condition of the projection optical system according to Numerical Example 3.

FIGS. 2, 4 and 6 are longitudinal aberration diagrams of the far point in-focus condition of the projection optical systems according to Numerical Examples 1 to 3, respectively.

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each Fig., indicated as F), and the solid line, the short dash line, the long dash line and the one-dot dash line indicate the characteristics to the d-line, the F-line, the C-line and the g-line, respectively. In each astigmatism diagram, the vertical axis indicates the image height (in each Fig., indicated as H), and the solid line and the dash line indicate the characteristics to the sagittal plane (in each Fig., indicated as "s") and the meridional plane (in each Fig., indicated as "m"), respectively. In each distortion diagram, the vertical axis indicates the image height (in each Fig., indicated as H).

Numerical Example 1

The projection optical system of Numerical Example 1 corresponds to Embodiment 1 shown in FIG. 1. Table 1 shows the surface data-1 of the projection optical system of Numerical Example 1. Table 2 shows the surface data-2. Table 3 shows the aspherical data. Table 4 shows the various data. Table 5 shows the zoom lens unit data.

TABLE 1

(Surface data-1)

| Surface number | r | d | nd | vd |
|---|---|---|---|---|
| Magnification-side conjugate surface | ∞ | | | |
| 1 | 70.60440 | 1.20000 | 1.54814 | 45.8 |
| 2 | 18.09880 | 1.45000 | | |
| 3* | 14.01570 | 2.60000 | 1.52996 | 55.8 |
| 4* | 10.89030 | 9.55000 | | |
| 5 | −37.32820 | 1.00000 | 1.48749 | 70.4 |
| 6 | 37.32820 | 4.10000 | 1.83400 | 37.3 |
| 7 | −168.71320 | Variable | | |
| 8 | 75.23240 | 2.70000 | 1.48749 | 70.4 |
| 9 | −75.32240 | Variable | | |
| 10 | 35.34460 | 4.10000 | 1.72916 | 54.7 |
| 11 | −77.97650 | 0.80000 | 1.64769 | 33.8 |
| 12 | 1182.40320 | Variable | | |
| 13(Aperture) | ∞ | 1.85000 | | |
| 14 | −41.15720 | 0.60000 | 1.65412 | 39.7 |
| 15 | 59.97210 | Variable | | |
| 16 | −20.95040 | 0.60000 | 1.72047 | 34.7 |
| 17 | 43.84630 | 4.80000 | 1.53775 | 74.7 |
| 18 | −24.75230 | 0.15000 | | |
| 19* | 67.44360 | 4.96000 | 1.49650 | 81.5 |
| 20* | −24.86320 | Variable | | |
| 21 | 34.09070 | 5.85000 | 1.67790 | 50.7 |
| 22 | −535.96200 | 2.71810 | | |
| 23 | ∞ | 14.00000 | 1.51680 | 64.2 |
| 24 | ∞ | 0.65000 | 1.51680 | 64.2 |
| 25 | ∞ | 11.30000 | | |
| 26 | ∞ | (BF) | | |
| Demagnification-side conjugate surface | ∞ | | | |

TABLE 2

(Surface data-2)

| Surface number | nC | nF | ng | PgF |
|---|---|---|---|---|
| Magnification-side conjugate surface | | | | |
| 1 | 1.54458 | 1.55654 | 1.56336 | 0.56990 |
| 2 | | | | |
| 3* | 1.52713 | 1.53662 | 1.54205 | 0.57218 |
| 4* | | | | |
| 5 | 1.48535 | 1.49227 | 1.49594 | 0.53049 |
| 6 | 1.82742 | 1.84975 | 1.86268 | 0.57894 |
| 7 | | | | |
| 8 | 1.48535 | 1.49227 | 1.49594 | 0.53049 |
| 9 | | | | |
| 10 | 1.72510 | 1.73844 | 1.74571 | 0.54521 |
| 11 | 1.64210 | 1.66124 | 1.67258 | 0.59229 |
| 12 | | | | |
| 13(Aperture) | | | | |
| 14 | 1.64923 | 1.66571 | 1.67516 | 0.57364 |
| 15 | | | | |
| 16 | 1.71437 | 1.73512 | 1.74723 | 0.58336 |
| 17 | 1.53555 | 1.54275 | 1.54664 | 0.54014 |
| 18 | | | | |
| 19* | 1.49464 | 1.50073 | 1.50401 | 0.53882 |
| 20* | | | | |
| 21 | 1.67388 | 1.68724 | 1.69467 | 0.55567 |
| 22 | | | | |
| 23 | | | | |
| 24 | | | | |
| 25 | | | | |
| 26 | | | | |
| Demagnification-side conjugate surface | | | | |

TABLE 3

(Aspherical data)

Surface No. 3

K = −7.84882E−01, A4 = −4.04914E−05,
A6 = −2.71935E−08, A8 = 3.62767E−10
A10 = −1.17929E−12, A12 = 0.00000E+00,
A14 = 0.00000E+00

Surface No. 4

K = −6.04644E−01, A4 = −8.22178E−05,
A6 = −1.49789E−07, A8 = 6.60797E−10
A10 = −3.50928E−12, A12 = 0.00000E+00,
A14 = 0.00000E+00

Surface No. 19

K = 0.00000E+00, A4 = −6.60041E−06,
A6 = −9.70801E−08, A8 = 1.71770E−09
A10 = −1.34824E−11, A12 = −2.50893E−14,
A14 = 5.04447E−16

Surface No. 20

K = 0.00000E+00, A4 = 4.79045E−06,
A6 = −6.61736E−08, A8 = 5.64223E−10
A10 = 4.90637E−12, A12 = −1.44009E−13,
A14 = 6.95154E−16

TABLE 4

(Various data)
Zooming ratio 2.15257

| | Wide-angle limit | Middle position | Telephoto limit |
|---|---|---|---|
| Focal length | 15.2017 | 20.2492 | 32.7226 |
| F-number | 2.05190 | 2.25945 | 2.76113 |
| Half view angle | 27.9526 | 21.5514 | 13.7577 |
| Image height | 7.9000 | 7.9000 | 7.9000 |
| Overall length of lens system | 129.4408 | 129.4432 | 129.4512 |
| BF | 0.00580 | 0.00818 | 0.01619 |
| d7 | 23.8184 | 11.2043 | 1.0000 |
| d9 | 10.9230 | 14.3314 | 1.0029 |
| d12 | 8.5716 | 12.2730 | 18.5847 |
| d15 | 10.1789 | 6.2787 | 3.4138 |
| d20 | 0.9650 | 10.3695 | 30.4555 |

TABLE 5

(Zoom lens unit data)

| Lens unit | Initial surface No. | Focal length |
|---|---|---|
| 1 | 1 | −33.65031 |
| 2 | 8 | 77.61956 |
| 3 | 10 | 47.37428 |
| 4 | 13 | −37.22568 |
| 5 | 16 | 57.53368 |
| 6 | 21 | 47.47827 |

Numerical Example 2

The projection optical system of Numerical Example 2 corresponds to Embodiment 2 shown in FIG. 3. Table 6 shows the surface data-1 of the projection optical system of Numerical Example 2. Table 7 shows the surface data-2. Table 8 shows the aspherical data. Table 9 shows the various data. Table 10 shows the zoom lens unit data.

TABLE 6

(Surface data-1)

| Surface number | r | d | nd | vd |
|---|---|---|---|---|
| Magnification-side conjugate surface | ∞ | | | |
| 1 | 87.56410 | 1.20000 | 1.54814 | 45.8 |
| 2 | 18.17510 | 0.40000 | | |
| 3* | 10.93870 | 2.00000 | 1.52996 | 55.8 |
| 4* | 8.59390 | 9.64940 | | |
| 5 | −28.88880 | 1.00000 | 1.48749 | 70.4 |
| 6 | −260.16160 | 0.69770 | | |
| 7 | 74.30380 | 3.31850 | 1.83400 | 37.3 |
| 8 | −106.10630 | Variable | | |
| 9 | 319.38370 | 3.37700 | 1.48749 | 70.4 |
| 10 | −44.03940 | Variable | | |
| 11 | 31.26360 | 0.60000 | 1.80518 | 25.5 |
| 12 | 25.03910 | 3.37660 | 1.69700 | 48.5 |
| 13 | 311.63540 | Variable | | |
| 14(Aperture) | ∞ | Variable | | |
| 15 | −34.18010 | 0.70140 | 1.65412 | 39.7 |
| 16 | 112.47780 | Variable | | |
| 17 | −28.75600 | 0.70000 | 1.83400 | 37.3 |
| 18 | 42.98850 | 4.61960 | 1.53775 | 74.7 |
| 19 | −16.73080 | 0.15000 | | |
| 20* | −166.50660 | 4.13630 | 1.49710 | 81.6 |
| 21* | −30.33550 | Variable | | |
| 22 | 27.09120 | 6.00000 | 1.59349 | 67.0 |
| 23 | 531.99520 | 0.94150 | | |
| 24 | ∞ | 15.80000 | 1.51680 | 64.2 |
| 25 | ∞ | 0.65000 | 1.51680 | 64.2 |
| 26 | ∞ | (BF) | | |
| Demagnification-side conjugate surface | ∞ | | | |

TABLE 7

(Surface data-2)

| Surface number | nC | nF | ng | PgF |
|---|---|---|---|---|
| Magnification-side conjugate surface | | | | |
| 1 | 1.54458 | 1.55654 | 1.56336 | 0.56990 |
| 2 | | | | |
| 3* | 1.52713 | 1.53662 | 1.54205 | 0.57218 |
| 4* | | | | |
| 5 | 1.48535 | 1.49227 | 1.49594 | 0.53049 |
| 6 | | | | |
| 7 | 1.82742 | 1.84975 | 1.86268 | 0.57894 |
| 8 | | | | |
| 9 | 1.48535 | 1.49227 | 1.49594 | 0.53049 |
| 10 | | | | |
| 11 | 1.79611 | 1.82774 | 1.84721 | 0.61557 |
| 12 | 1.69270 | 1.70706 | 1.71509 | 0.55876 |
| 13 | | | | |
| 14(Aperture) | | | | |
| 15 | 1.64923 | 1.66571 | 1.67516 | 0.57364 |
| 16 | | | | |
| 17 | 1.82742 | 1.84975 | 1.86268 | 0.57894 |
| 18 | 1.53555 | 1.54275 | 1.54664 | 0.54014 |
| 19 | | | | |
| 20* | 1.49524 | 1.50134 | 1.50462 | 0.53835 |
| 21* | | | | |
| 22 | 1.59078 | 1.59964 | 1.60439 | 0.53654 |
| 23 | | | | |
| 24 | | | | |
| 25 | | | | |
| 26 | | | | |
| Demagnification-side conjugate surface | | | | |

TABLE 8

(Aspherical data)

Surface No. 3

K = −4.02719E−01, A4 = −1.43480E−04,
A6 = −6.74481E−07, A8 = 1.98236E−08
A10 = −4.10397E−10, A12 = 5.30525E−12,
A14 = −4.36793E−14, A16 = 2.16642E−16
A18 = −5.85102E−19, A20 = 6.38112E−22

Surface No. 4

K = −7.44946E−01, A4 = −1.63073E−04,
A6 = −9.29959E−07, A8 = 3.83891E−08
A10 = −9.71057E−10, A12 = 1.55915E−11,
A14 = −1.57997E−13, A16 = 9.72510E−16
A18 = −3.31300E−18, A20 = 4.78029E−21

Surface No. 20

K = 0.00000E+00, A4 = −5.55036E−05,
A6 = −3.06006E−07, A8 = 1.01989E−09
A10 = −2.97405E−11, A12 = 0.00000E+00,
A14 = 0.00000E+00, A16 = 0.00000E+00
A18 = 0.00000E+00, A20 = 0.00000E+00

Surface No. 21

K = 0.00000E+00, A4 = −4.33393E−05,
A6 = −2.31202E−07, A8 = 3.26642E−10
A10 = −1.58192E−11, A12 = 2.77840E−14,
A14 = −2.10121E−16, A16 = 1.81191E−30
A18 = 0.00000E+00, A20 = 0.00000E+00

TABLE 9

(Various data)
Zooming ratio 2.10000

| | Wide-angle limit | Middle position | Telephoto limit |
|---|---|---|---|
| Focal length | 15.9999 | 21.5998 | 33.5997 |
| F-number | 2.05008 | 2.27405 | 2.74866 |
| Half view angle | 26.8759 | 20.4281 | 13.6086 |
| Image height | 7.9000 | 7.9000 | 7.9000 |
| Overall length of lens system | 129.3073 | 129.3071 | 129.3078 |
| BF | 12.30042 | 12.30030 | 12.30088 |
| d8 | 24.9619 | 11.3489 | 0.5055 |
| d10 | 10.0000 | 13.3417 | 2.0000 |
| d13 | 8.6180 | 12.3995 | 18.3756 |
| d14 | 2.6611 | 2.5497 | 2.5000 |
| d16 | 10.9479 | 6.7581 | 3.2837 |
| d21 | 0.5000 | 11.2909 | 31.0241 |

TABLE 10

(Zoom lens unit data)

| Lens unit | Initial surface No. | Focal length |
|---|---|---|
| 1 | 1 | −36.24841 |
| 2 | 9 | 79.63443 |
| 3 | 11 | 51.68154 |
| 4 | 15 | −39.99967 |
| 5 | 17 | 66.01031 |
| 6 | 22 | 47.88435 |

Numerical Example 3

The projection optical system of Numerical Example 3 corresponds to Embodiment 3 shown in FIG. 5. Table 11 shows the surface data-1 of the projection optical system of Numerical Example 3. Table 12 shows the surface data-2. Table 13 shows the aspherical data. Table 14 shows the various data. Table 15 shows the zoom lens unit data.

TABLE 11

(Surface data-1)

| Surface number | r | d | nd | vd |
|---|---|---|---|---|
| Magnification-side conjugate surface | ∞ | | | |
| 1 | 78.85910 | 1.20000 | 1.54814 | 45.8 |
| 2 | 18.38700 | 1.01560 | | |
| 3* | 12.38010 | 2.60000 | 1.52996 | 55.8 |
| 4* | 9.56380 | 9.33160 | | |
| 5 | −38.71530 | 1.00000 | 1.48749 | 70.4 |
| 6 | 34.43180 | 4.55410 | 1.83400 | 37.3 |
| 7 | −184.36830 | Variable | | |
| 8 | 77.54290 | 3.37020 | 1.48749 | 70.4 |
| 9 | −66.10550 | Variable | | |
| 10 | 34.89760 | 3.80000 | 1.72916 | 54.7 |
| 11 | −62.41880 | 0.83290 | 1.64769 | 33.8 |
| 12 | 414.70790 | Variable | | |
| 13(Aperture) | ∞ | 2.05730 | | |
| 14 | −42.01700 | 0.70000 | 1.65412 | 39.7 |
| 15 | 69.80660 | Variable | | |
| 16 | −22.62440 | 0.70000 | 1.72047 | 34.7 |
| 17 | 48.31210 | 4.01700 | 1.53775 | 74.7 |
| 18 | −23.16950 | 0.15040 | | |
| 19* | 100.88350 | 6.28650 | 1.49650 | 81.5 |
| 20* | −26.65900 | Variable | | |
| 21 | 35.91400 | 4.00000 | 1.67790 | 50.7 |
| 22 | −262.54000 | 0.73880 | | |
| 23 | ∞ | 15.80000 | 1.51680 | 64.2 |
| 24 | ∞ | 0.65000 | 1.51680 | 64.2 |
| 25 | ∞ | (BF) | | |
| Demagnification-side conjugate surface | ∞ | | | |

TABLE 12

(Surface data-2)

| Surface number | nC | nF | ng | PgF |
|---|---|---|---|---|
| Magnification-side conjugate surface | | | | |
| 1 | 1.54458 | 1.55654 | 1.56336 | 1.56336 |
| 2 | | | | |
| 3* | 1.52713 | 1.53662 | 1.54205 | 1.54205 |
| 4* | | | | |
| 5 | 1.48535 | 1.49227 | 1.49594 | 1.49594 |
| 6 | 1.82742 | 1.84975 | 1.86268 | 1.86268 |
| 7 | | | | |
| 8 | 1.48535 | 1.49227 | 1.49594 | 1.49594 |
| 9 | | | | |
| 10 | 1.72510 | 1.73844 | 1.74571 | 1.74571 |
| 11 | 1.64210 | 1.66124 | 1.67258 | 1.67258 |
| 12 | | | | |
| 13(Aperture) | | | | |
| 14 | 1.64923 | 1.66571 | 1.67516 | 1.67516 |
| 15 | | | | |
| 16 | 1.71437 | 1.73512 | 1.74723 | 1.74723 |
| 17 | 1.53555 | 1.54275 | 1.54664 | 1.54664 |
| 18 | | | | |
| 19* | 1.49464 | 1.50073 | 1.50401 | 1.50401 |
| 20* | | | | |
| 21 | 1.67388 | 1.68724 | 1.69467 | 1.69467 |
| 22 | | | | |
| 23 | | | | |
| 24 | | | | |
| 25 | | | | |
| Demagnification-side conjugate surface | | | | |

TABLE 13

(Aspherical data)

Surface No. 3

K = −2.67150E−01, A4 = −9.64917E−05,
A6 = −7.52921E−07, A8 = 2.05883E−08
A10 = −4.28244E−10, A12 = 5.59767E−12,
A14 = −4.55465E−14, A16 = 2.19180E−16
A18 = −5.66296E−19, A20 = 5.89337E−22

Surface No. 4

K = −7.93009E−01, A4 = −9.79704E−05,
A6 = −9.56834E−07, A8 = 3.69768E−08
A10 = −9.52954E−10, A12 = 1.57040E−11,
A14 = −1.60416E−13, A16 = 9.78728E−16
A18 = −3.26243E−18, A20 = 4.56484E−21

Surface No. 19

K = 0.00000E+00, A4 = −1.48796E−05,
A6 = −1.35579E−07, A8 = 8.94213E−10
A10 = −6.78590E−12, A12 = 0.00000E+00,
A14 = 0.00000E+00, A16 = 0.00000E+00
A18 = 0.00000E+00, A20 = 0.00000E+00

Surface No. 20

K = 0.00000E+00, A4 = −2.25053E−06,
A6 = −1.37128E−07, A8 = 9.18122E−10
A10 = 5.44050E−12, A12 = −3.65609E−13,
A14 = 4.77836E−15, A16 = −2.94592E−17
A18 = 7.18888E−20, A20 = 0.00000E+00

TABLE 14

(Various data)
Zooming ratio 2.06996

|  | Wide-angle limit | Middle position | Telephoto limit |
|---|---|---|---|
| Focal length | 15.6513 | 21.0048 | 32.3975 |
| F-number | 2.05066 | 2.25454 | 2.70347 |
| Half view angle | 27.2453 | 20.8141 | 13.8598 |
| Image height | 7.9000 | 7.9000 | 7.9000 |
| Overall length of lens system | 128.7404 | 128.7427 | 128.7498 |
| BF | 12.30559 | 12.30800 | 12.31503 |
| d7 | 22.8988 | 10.3141 | 0.7991 |
| d9 | 10.5758 | 13.6740 | 2.6000 |
| d12 | 8.1819 | 12.1488 | 18.0892 |
| d15 | 10.6518 | 6.5828 | 3.3801 |
| d20 | 1.3221 | 10.9106 | 28.7620 |

TABLE 15

(Zoom lens unit data)

| Lens unit | Initial surface No. | Focal length |
|---|---|---|
| 1 | 1 | −33.24552 |
| 2 | 8 | 73.76761 |
| 3 | 10 | 48.38641 |
| 4 | 13 | −39.99969 |
| 5 | 16 | 60.85008 |
| 6 | 21 | 46.85711 |

Table 16 shows the corresponding values to the conditions (1) and (2) in the projection optical systems of each of Numerical Examples. Table 17 shows the corresponding values to the conditions (3) and (4) in the projection optical systems of each of Numerical Examples. Table 18 shows the corresponding values to the condition (5) in the projection optical systems of each of Numerical Examples. Table 19 shows the corresponding values to the conditions (6), (7) and (8) in the projection optical systems of each of Numerical Examples.

TABLE 16

(Values corresponding to conditions (1) and (2))

| | | Numerical Example | | |
|---|---|---|---|---|
| Condition | | 1 | 2 | 3 |
| (1) | $f_W/f_1$ | −0.452 | −0.441 | −0.471 |
| (2) | $f_{123T}/f_{123W}$ | 2.103 | 1.989 | 2.043 |
| | $f_1$ | −33.651 | −36.249 | −33.246 |
| | $f_{123W}$ | 22.711 | 23.458 | 22.945 |
| | $f_{123T}$ | 47.768 | 46.668 | 46.869 |
| | $f_W$ | 15.202 | 16.000 | 15.651 |
| | $f_T$ | 32.723 | 33.600 | 32.398 |
| | $f_T/f_W$ | 2.153 | 2.100 | 2.070 |

TABLE 17

(Values corresponding to conditions (3) and (4))

| | | Numerical Example | | |
|---|---|---|---|---|
| Condition | | 1 | 2 | 3 |
| (3) | $D_{23W}/f_W$ | 0.719 | 0.625 | 0.676 |
| (4) | $D_{23T}/f_T$ | 0.031 | 0.060 | 0.080 |
| | $D_{23W}$ | 10.923 | 10.000 | 10.576 |
| | $D_{23T}$ | 1.003 | 2.000 | 2.600 |
| | $f_W$ | 15.202 | 16.000 | 15.651 |
| | $f_T$ | 32.723 | 33.600 | 32.398 |

TABLE 18

(Values corresponding to condition (5))

| | | Numerical Example | | |
|---|---|---|---|---|
| Condition | | 1 | 2 | 3 |
| (5) | $(R_{41} + R_{42})/(R_{41} - R_{42})$ | −0.186 | −0.534 | −0.249 |
| | $R_{41}$ | −41.157 | −34.180 | −42.017 |
| | $R_{42}$ | 59.972 | 112.478 | 69.807 |

TABLE 19

(Values corresponding to conditions (6), (7) and (8))

| | | Numerical Example | | |
|---|---|---|---|---|
| Condition | | 1 | 2 | 3 |
| (6) | $0.0018 \times vd_A + PgF_A$ | 0.646 | 0.646 | 0.646 |
| (7) | $0.0018 \times vd_B + PgF_B$ | 0.675 | 0.675 | 0.675 |
| (8) | $0.0018 \times vd_C + PgF_C$ | 0.686 | 0.685 | 0.686 |
| | $vd_A$ | 34.707 | 37.344 | 34.707 |
| | $vd_B$ | 74.680 | 74.680 | 74.680 |
| | $vd_C$ | 81.541 | 81.558 | 81.541 |
| | $PgF_A$ | 0.583 | 0.579 | 0.583 |
| | $PgF_B$ | 0.540 | 0.540 | 0.540 |
| | $PgF_C$ | 0.539 | 0.538 | 0.539 |

The projection optical system according to the present disclosure is applicable to a projector or the like. In particular, the projection optical system according to the present disclosure is applicable to a small-sized projector which demands a high magnification ratio.

As described above, embodiments have been described as examples of art in the present disclosure. Thus, the attached drawings and detailed description have been provided.

Therefore, in order to illustrate the art, not only essential elements for solving the problems but also elements that are not necessary for solving the problems may be included in elements appearing in the attached drawings or in the detailed description. Therefore, such unnecessary elements should not be immediately determined as necessary elements because of their presence in the attached drawings or in the detailed description.

Further, since the embodiments described above are merely examples of the art in the present disclosure, it is understood that various modifications, replacements, additions, omissions, and the like can be performed in the scope of the claims or in an equivalent scope thereof

What is claimed is:

1. A projection optical system, in order from a magnification side to a demagnification side, comprising a first lens unit having negative optical power, a second lens unit having positive optical power, a third lens unit having positive optical power, a fourth lens unit having optical power, a fifth lens unit having optical power, and a sixth lens unit having optical power, wherein in zooming from a wide-angle limit to a telephoto limit, the second lens unit and the third lens unit move along an optical axis, in focusing from a far point in-focus condition to a near point in-focus condition, the first lens unit moves along the optical axis, and the following conditions (1) and (2) are satisfied:

$$-0.55 < f_W/f_1 < -0.30 \qquad (1)$$

$$1.9 \leq f_{123T}/f_{123W} \leq f_T/f_W \qquad (2)$$

where $f_1$ is a focal length of the first lens unit, $f_{123W}$ is a composite focal length of the first lens unit, the second lens unit, and the third lens unit at the wide-angle limit, $f_{123T}$ is a composite focal length of the first lens unit, the second lens unit, and the third lens unit at the telephoto limit, $f_W$ is a focal length of the projection optical system at the wide-angle limit, and $f_T$ is a focal length of the projection optical system at the telephoto limit.

2. The projection optical system as claimed in claim 1, wherein the number of lens elements constituting the second lens unit and the third lens unit is three in total, one of the second and third lens units is composed of one lens element, the other of the second and third lens units is composed of one lens element having negative optical power and one lens element having positive optical power, and the following conditions (3) and (4) are satisfied:

$$0.5 < D_{23W}/f_W < 1.0 \qquad (3)$$

$$0.01 < D_{23T}/f_T < 0.10 \qquad (4)$$

where $D_{23W}$ is an optical axial interval at the wide-angle limit between a lens surface, closest to the demagnification side, of the second lens unit and a lens surface, closest to the magnification side, of the third lens unit, and $D_{23T}$ is an optical axial interval at the telephoto limit between the lens surface, closest to the demagnification side, of the second lens unit and the lens surface, closest to the magnification side, of the third lens unit.

3. The projection optical system as claimed in claim 1, wherein the fourth lens unit has negative optical power, and is composed of one lens element, an aperture that regulates an optical axial light beam is placed at a position closest to the magnification side in the fourth lens unit, or between the third lens unit and the fourth lens unit, and the following condition (5) is satisfied:

$$-0.8 < (R_{41}+R_{42})/(R_{41}-R_{42}) < 0.2 \qquad (5)$$

where $R_{41}$ is a radius of curvature of a lens surface, on the magnification side, of the lens element constituting the fourth lens unit, and $R_{42}$ is a radius of curvature of a lens surface, on the demagnification side, of the lens element constituting the fourth lens unit.

4. The projection optical system as claimed in claim 1, wherein the fifth lens unit has positive optical power, and comprises, in order from the magnification side to the demagnification side, a lens element A having negative optical power, a lens element B having positive optical power, and a lens element C having positive optical power, and the following conditions (6), (7) and (8) are satisfied:

$$0.0018 \times vd_A + PgF_A < 0.670 \qquad (6)$$

$$0.0018 \times vd_B + PgF_B > 0.650 \qquad (7)$$

$$0.0018 \times vd_C + PgF_C > 0.650 \qquad (8)$$

where $vd_A$ is an Abbe number to a d-line of the lens element A, $vd_B$ is an Abbe number to a d-line of the lens element B, $vd_C$ is an Abbe number to a d-line of the lens element C, $PgF_A$ is a partial dispersion ratio of the lens element A, which is the ratio of a difference between a refractive index to a g-line and a refractive index to an F-line, to a difference between the refractive index to the F-line and a refractive index to a C-line, $PgF_B$ is a partial dispersion ratio of the lens element B, which is the ratio of a difference between a refractive index to a g-line and a refractive index to an F-line, to a difference between the refractive index to the F-line and a refractive index to a C-line, and $PgF_C$ is a partial dispersion ratio of the lens element C, which is the ratio of a difference between a refractive index to a g-line and a refractive index to an F-line, to a difference between the refractive index to the F-line and a refractive index to a C-line.

5. A projection apparatus comprising:

the projection optical system as claimed in claim 1;

a light source section; and a light valve placed at a conjugate point on the demagnification side of the projection optical system, the light valve spatially modulating light from the light source section.

* * * * *